(12) United States Patent
Loh et al.

(10) Patent No.: US 7,605,188 B2
(45) Date of Patent: Oct. 20, 2009

(54) POLYMER FOAMS CONTAINING MULTI-FUNCTIONAL LAYERED NANO-GRAPHITE

(75) Inventors: Roland R. Loh, Stow, OH (US); Mark E. Polasky, Mogadore, OH (US); Joseph P. Rynd, Cuyahoga Falls, OH (US); James Lee, Columbus, OH (US); Xiangmin Han, Columbus, OH (US); Kurt W. Koelling, Powell, OH (US); Yadollah Delaviz, Lewis Center, OH (US)

(73) Assignee: Owens Corning Intellectual Capital, LLC DE (US)

( * ) Notice: Subject to any disclaimer, the term of this patent is extended or adjusted under 35 U.S.C. 154(b) by 337 days.

(21) Appl. No.: 11/026,011

(22) Filed: Dec. 31, 2004

(65) Prior Publication Data

US 2006/0148916 A1 Jul. 6, 2006

(51) Int. Cl.
*C08J 9/12* (2006.01)
(52) U.S. Cl. ............................ 521/83; 521/97; 521/142; 521/146
(58) Field of Classification Search .................... 521/83, 521/97
See application file for complete search history.

(56) References Cited

U.S. PATENT DOCUMENTS

| | | | |
|---|---|---|---|
| 2,365,086 | A | 12/1944 | Kamowski |
| 3,574,644 | A | 4/1971 | Olstowski et al. |
| 5,679,718 | A | 10/1997 | Suh et al. |
| 5,719,199 | A | 2/1998 | Wallace et al. |
| 5,854,295 | A | 12/1998 | Suh et al. |
| 6,213,540 | B1 | 4/2001 | Tusim et al. |
| 6,387,968 | B1 | 5/2002 | Gluck et al. |
| 6,417,240 | B1 | 7/2002 | Park |
| 6,420,442 | B1 * | 7/2002 | Dietzen et al. ................ 521/82 |
| 6,521,672 | B1 | 2/2003 | Gluck et al. |
| 2001/0036970 | A1 | 11/2001 | Park |
| 2002/0041955 | A1 | 4/2002 | Watanabe et al. |
| 2003/0082343 | A1 | 5/2003 | Brucker |
| 2003/0205832 | A1 * | 11/2003 | Lee et al. ...................... 264/53 |
| 2005/0112356 | A1 * | 5/2005 | Rynd et al. .............. 428/317.9 |

FOREIGN PATENT DOCUMENTS

| | | |
|---|---|---|
| DE | 102004019708 | 11/2005 |
| EP | 0 729 999 | 4/1996 |
| EP | 0863175 | 9/1998 |
| EP | 1 205 437 | 5/2002 |
| WO | WO 97/31053 | 8/1997 |
| WO | WO 2004/065461 | 8/2004 |

OTHER PUBLICATIONS

Guo-Hua Chen, Da-Jun Wu, Wen-Gui Weng, and Wen-Li Yan; Dispersion of Graphite Nanosheets in a Polymer Matrix and the Conducting Property of the Nanocomposites; Polymer Engineering and Science, Dec. 2001, vol. 41, No. 12; pp. 2148-2154.*
Zhang, et al., Preparation and Combustion Properties of Flame Retardant SBA Copolymer/Graphite Oxide Nanocomposites, Macromol., Mater Eng., Mar. 2004, 289,355-59.*
Cassegneau, et al., Preparation and Characterization of Ultrathin Films Layer-by-Layer Self Assembled from graphite Oxide Nanoplatelets and Polymer, Langmuir, 2000, 16, 7318-24.*

* cited by examiner

*Primary Examiner*—Irina S Zemel
(74) *Attorney, Agent, or Firm*—James J. Dottavio; Jason S. Fokens

(57) ABSTRACT

This invention relates to foam insulating products, particularly extruded polystyrene foam, containing multi-layered nano-graphite as a process additive for improving the physical properties of foam products.

14 Claims, 6 Drawing Sheets

FIG. 2 Preparation of GMA-functionalized graphite

FIG. 3
Dispersion of graphite (1%) in styrene
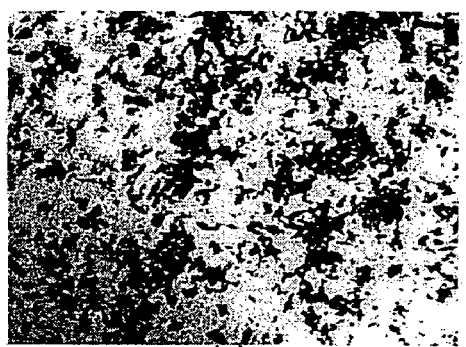
(a)
(b)
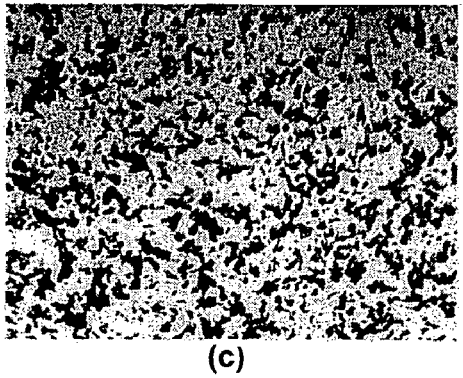
(c)
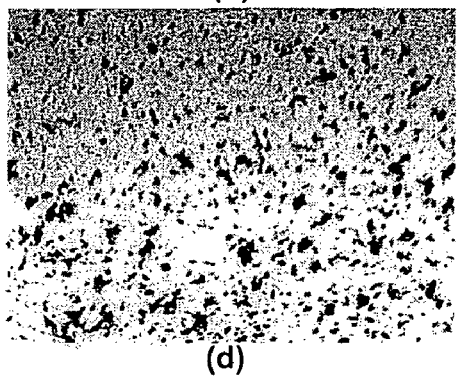
(d)
(a) acid-treated graphite, without homogenization or ultra-sonication.
(b) acid-treated graphite, with homogenization (3 mins) and ultra-sonication (30 mins).
(c) GMA-functionalized graphite, without homogenization or ultra-sonication.
(d) GMA-functionalized graphite, with homogenization (3 mins) or ultra-sonication (30 mins).

FIG. 4
Foam structure of the 4 foam samples:
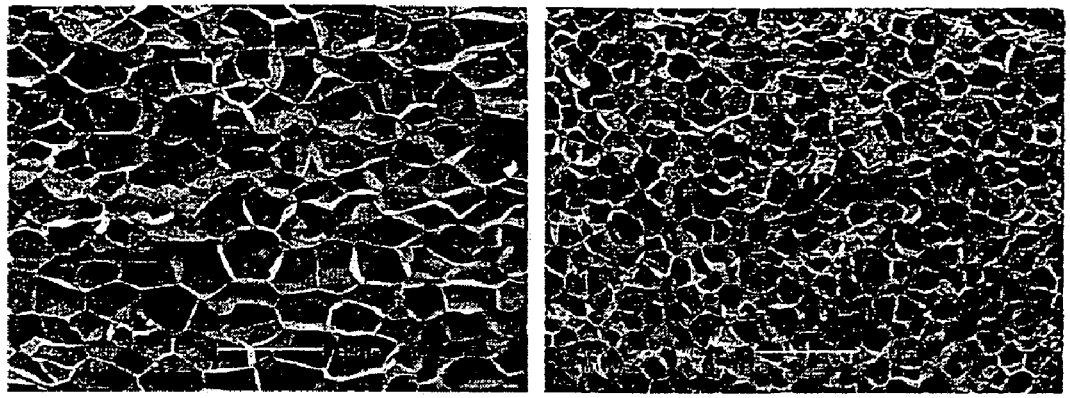
(a)    (b)
500 μm
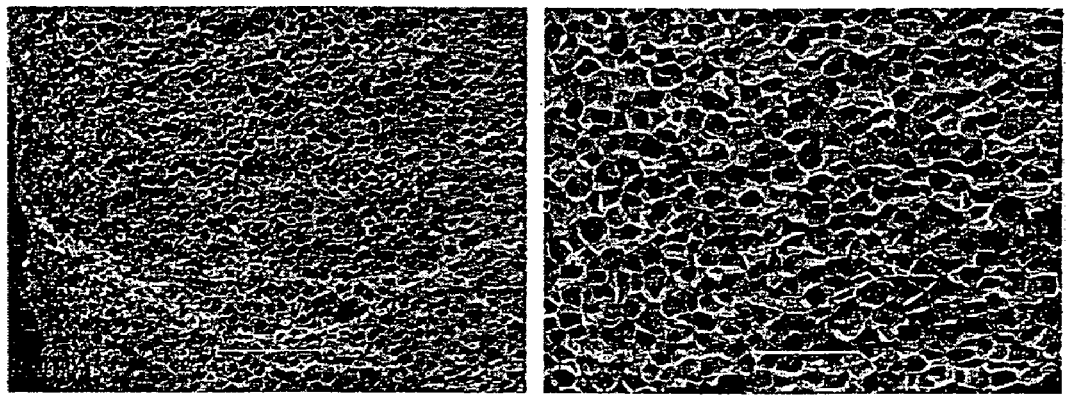
(c)    (d)
(a) PS
(b) PS/0.25% milled worms
(c) PS/0.5% milled worms
(d) PS/0.25% expanded worms

POLYMER FOAMS CONTAINING MULTI-FUNCTIONAL LAYERED NANO-GRAPHITE

TECHNICAL FIELD AND INDUSTRIAL APPLICABILITY OF THE INVENTION

The present invention relates to rigid foamed polymeric boards containing multi-layered nano-graphite. More particularly, it relates to rigid foamed polymeric board wherein multi-layered nano-graphite is added as a process additive to improve the process, and to control the cell morphology, as well as to increase insulating capability, UV stability, dimensional stability, and mechanical strength of the polymeric foamed board.

BACKGROUND OF THE INVENTION

The usefulness of rigid foamed polymeric boards in a variety of applications is well known. For instance, polymeric foam boards are widely used as isulating structural members.

In the past, infrared attenuating agents (IAAs) such as carbon black powdered amorphous carbon, graphite, and titanium dioxide have been used as fillers in polymeric foam boards to minimize material thermal coductivity which, in turn, will maximize insulating capability (increase R-value) for a given thickness. Thermal conductivity, k is defined as the ratio of the heat flow per unit cross-sectional to the temperature drop per unit thickness with the US unit:

$$\frac{Btu \cdot in}{Hr \cdot Ft^2 \cdot °F.}$$

And the metric unit: $\frac{W}{m \cdot °K.}$

The heat transfer through an insulating material can occur through solid conductivity, gas conductivity, radiation, and convection. The total thermal resistance (R-value), R is the measure of the resistance to heat transfer, and is determined as:

$$R=t/k$$

Where, t thickness.

Rigid foamed plastic boards are extensively used as thermal insulating materials for many applications. It is highly desirable to improve the thermal conductivity without increasing the density, and/or the thickness of foam product. Particularly, the architectural community desires a foam board having a thermal resistance value of R=10, with a thickness of less than 1.8", for cavity wall construction, to keep at least 1" of the cavity gap clean.

It is also desirable to improve the UV stability, particularly for such as exterior wall insulation finishing system (EIFS), and highway and railway underground applications where prolonged exposure of sun light of the surface of the polymer foam boards are usually occurred in job-sites.

It is also desirable to improve the dimensional stability at elevated temperature and/or high humidity for such as indoor pool roofing, exterior wall insulation. U.S. Pat. No. 5,679,718 illustrates a microcellular extruded polystyrene foam containing graphite as an infrared attenunating agent (IAA). The IAA provide a greater proportional reduction in foam thermal conductivity than foams having a larger cell size.

U.S. Pat. No. 6,420,442 shows a flame-proofed polystyrene foam material containing expanded graphite having a particle size of from 20 to 1000 micrometers. The foam is flame-retardant.

U.S. Pat. No. 6,213,540 illustrates an extruded thermoplastic foam having a high compressive strength. The thermal resistance of the foam may be enhanced by adding fillers such as carbon black particulates, clay particulates or carbon or graphite fibers.

U.S. Pat. No. 3,574,644 shows a method of increasing the flame retardance of normally flammable materials by adding expandable graphite. Expanded graphite having a particle size of from about 10 to 325 mesh may be added to a film forming agent or other polymeric materials such as polyesterds, polystyrene and polyethylene. Larger particles of graphite are preferred because the expansion ration of the larger flake is greater than that of a smaller flake.

U.S. Pat. No. 5,719,199 shows a flame retardant flexible, polymeric foam which contains expandable graphite as a fire retardant.

U.S. Pat. No. 5,854,295 illustrates a microcellular, polymeric foam containing an infrared attenuating (IAA) agent to reduce thermal conductivity. The IAA may be particulate flakes of metals or carbonaceous substances such as carbon black and natural or synthetic graphite.

U.S. Pat. No. 6,387,968 shows a method for producing water expandable styrene polymers using water as a sole blowing agent. Styrene is polymerized in an aqueous suspension in the presence of from 0.1 to 15% by weight of a solid substance insoluble in water and in styrene such as carbon black or graphite. The graphite has an average particle size from 2 to 20 micrometers.

U.S. Patent Application Publication No. 2001/0036970 shows polymer foam having improved thermal insulating performance. The thermoplastic foam, typical made from polyethylene rein or polypropylene resin or blends thereof, may contain an IAA such as carbon black, graphite, or titanium dioxide to enhance thermal insulating capability.

U.S. Patent Application Publication No. 2003/0082343 illustrates a bendable thermoplastic foam which contains a slit to reinforce the foam. The foam may contain additives such as thermally insulating additives including aluminum, gold, silver, carbon black and graphite.

European Patent Application No. 729,000 shows a fire-retardant polymer composition containing 100 parts by weight polyolefin or polystyrene, 1-30 parts by weight of an oxide or a complex oxide of metals such as antimony, boron and moybdenum and 1-30 parts of heat-expandable graphite. The graphite of a preferred particle size distribution contains the particles passing through a 80-mesh sieve at a content of 20% or lower by weight, more preferably from 1% to 20% by weight. Graphite containing the particles at a content of lower than 1% by weight would slightly impair the shape-retaining properties of the resin composition when the resin composition is exposed to fire.

All of the above patents teach foams with 1 to 30% by weight graphite—either natural or synthetic graphite, or expandable graphite in the particle size around 2 to 1000 micrometers, having decreased thermal conductivity, and improved flame resistance.

Regular low density foams have very thin cell wall thickness in the range of 0.2 to 6 microns. Particularly, in order to enhance the insulation R-value, a target cell wall thickness of less than 0.1 micron is needed.

Thus, there is a need to graphite having at least in one dimension—usually the thickness of the plate shaped graphite in nano-scale, i.e., less than 0.1 microns or 100 nanometers. It is an object of the present invention to provide a process for preparing low density extruded polymer foams containing multi-layered nano-graphite which has good processing properties, and improved foam physical properties, including thermal conductivity, ultraviolet (UV) radiation resistance, dimensional stability, mechanical strength, flame spread rate and smoke density.

SUMMARY

The present invention relates to foam insulating products and the processes for making such products, such as extruded polystyrene foam, containing multi-layered nano-graphite as a process additive to improve the physical properties, such as thermal insulation and compressive strength. During foaming, multi-layered nano-graphite acts as a nucleator and lubricant as well as its slipping action makes the flow of the melted polymer in the extruder easier, and provides a smooth surface to the foam board. Further, the multi-layered nano-graphite reduces the amount of static present during the foaming process due to the increased electric conductivity of the skin of the nano-graphite polymer foam boards.

Multi-layered nano-graphite in a foam product also acts as a UV stabilizer and as a gas barrier in the final product.

It is an object of the present invention to produce a rigid polymer foam containing multi-layered nano-graphite which exhibits overall compound effects on foam properties including improved insulating value (increased R-value) for a given thickness and density, and ultraviolet (UV) stability.

It is another object of the present invention to produce a rigid polymer foam containing multi-layered nano-graphite having retained or improved compressive strength, thermal dimensional stability and fire resistance properties.

It is another object of the present invention to provide multi-layered nano-graphite in a rigid polymer foam which also acts as a process additive which control the cell morphology, reduces static and provides lubrication during the foaming process.

It is another object of the present invention to lower the cost of a polymeric foam product in a simple and economical manner, such as by using multi-layered nano-graphite as a low cost, functional colorant.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF DRAWINGS

FIGS. 3a-3d are optical microscope images of multi-layered nano-graphite dispersed in polystyrene.

FIGS. 4a-4d are SEM images of polystyrene foam cell walls and struts containing multi-layered nano-graphite.

DETAILED DESCRIPTION OF INVENTION

Figure 1:
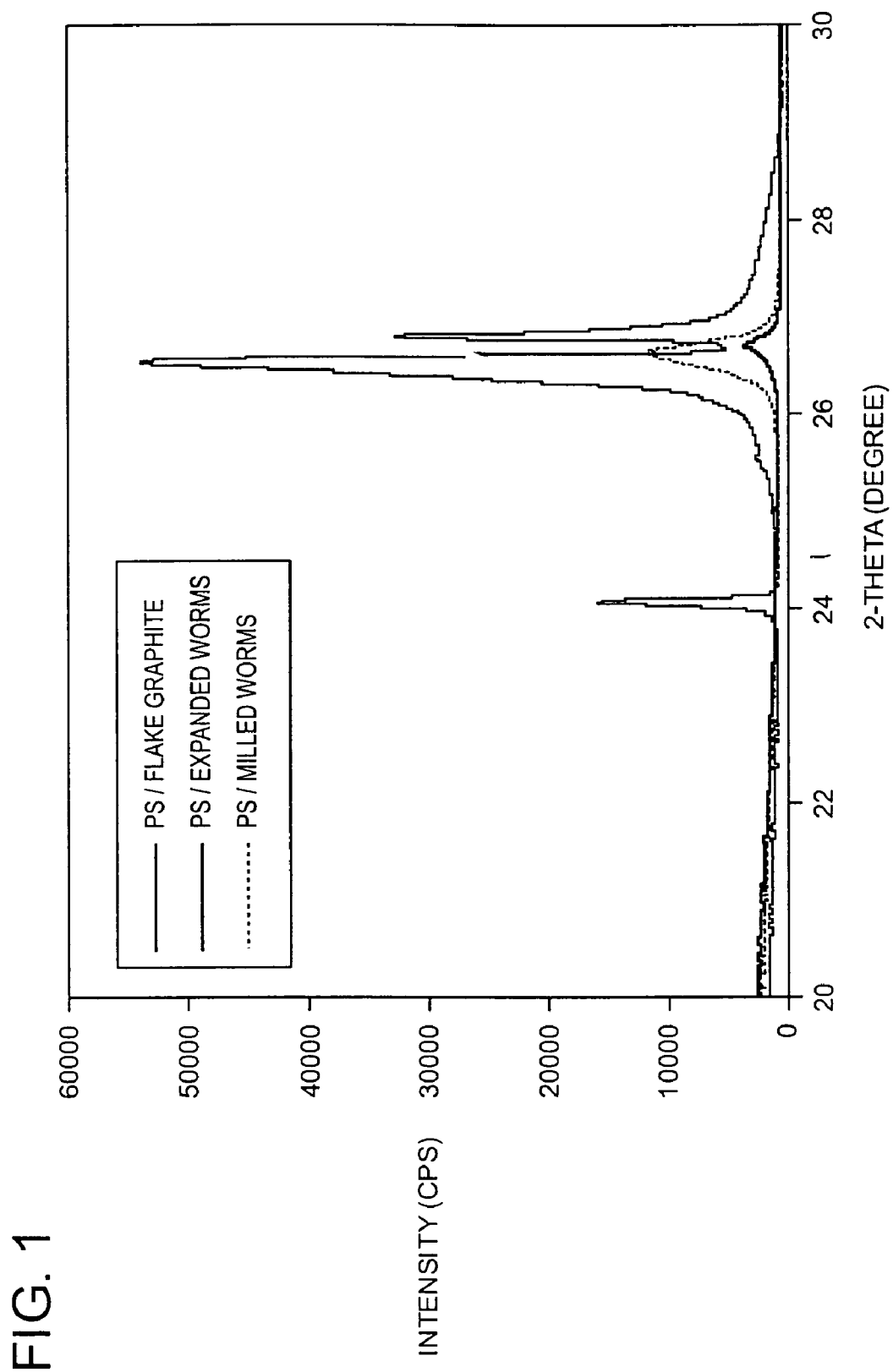
FIG. 1 is a graphical illustration showing the x-ray diffraction pattern of various forms of graphite in polystyrene polymer foam.

The above objects have been achieved through the development of a rigid, polymer foam which contains multi-layered nano-graphite to provide infrared attenuation, controls cell morphology and acts as a gas diffusion barrier. The foam exhibits improved thermal insulation (R-values). The present invention particularly relates to the production of a rigid, closed cell, polymer foam board prepared by extruding process with multi-layered nano-graphite, at least one blowing agent and other additives.

The rigid foamed plastic materials may be any such materials suitable to make polymer foams, which include polyolefins, polyvinylchloride, polycarbonates, polyetherimides, polyamides, polyesters, polyvinylidene chloride, polymethylmethacrylate, polyurethanes, polyurea, phenol-formaldehyde, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A preferred thermoplastic polymer comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene Preferred structures comprise substantially (i.e., greater than about 95 percent) and most preferably entirely of polystyrene. The present invention relates to a process for preparing a foam product involving the steps of forming a foamable mixture of (1) polymers having weight-average molecular weights from about 30,000 to about 500,000. In one embodiment, the polystyrene has weight-average molecular weight about 250,000, and (2) multi-layered nano-graphite, (3) a blowing agent, (4) other process additives, such as a nucleation agent, flame retardant chemicals, foaming the mixture in a region of atmosphere or reduced pressure to form the foam product.

The nano-graphite used in this invention is a multi-layered nano-graphite which has at least in one dimension, most likely the thickness of the particle, less than about 100 nanometers.

The multi-layered nano-graphite of the present invention may be in one of the following forms: an intercalated, or exfoliated, multi-layered nano-graphite such as by furnace high temperature expansion from acid-treated natural graphite, or microwave heating expansion from moisture saturated natural graphite.

It is preferable that the above expanded graphite be mechanically treated such as by air jet milling to pulverize the nano-graphite particles. The pulverization of the particles ensures that the nano-graphite flake thickness is less than 100 nm, and that the other dimensions of particles are less than about 20 microns, most likely less than about 5 microns.

It is preferable that the above expanded graphite be chemically treated, i.e., grafting, so as to induce carboxyl and phenolic hydroxyl functional groups on the graphite edge, i.e., or further grafting with other functional group. Grafting of the graphite enables the graphite to be more dispersive in the polymer foam. Standard graphing procedures may be utilized; however an example of one treatment is oxidation where the surface of the graphite is oxidized. Acid is added to the nano-graphite causing a strong oxidation reaction between concentrated nitric acid and carbons on graphite surfaces so as to induce carboxyl and phenolic hydroxyl functional groups on the graphite surface. In this method the graphite is boiled in 70% nitric acid at a temperature between 115 and 140° C. Another method which may be used to oxidize the graphite surface involves exposing the graphite to an oxidic gas or a mixture of reactive gases.

It is preferable that the chemically treated expanded graphite be further grafted with other functional groups, e.g. acid treated graphite containing carboxylic acid groups on the carbon surface further functionalized with glycidyl methacylate (GMA) to improve the dispersion of the resulting graphite in polymers.

After treatment of the graphite, the polymer and multi-layered nano-graphite and prepared via in-situ polymerization. It is preferably to use a monomer, such as styrene, methyl methacrylate, or a mixture of monomers. Preferably, styrene monomer and an initiator (catalyst), such as benzoyl peroxide (BPO), or 2,2'-azobisisobutyronitrile (AIBN), are blended together completely using a conventional mixing apparatus such as a homogenizer. The multi-layered nano-graphite is then added to the styrene-initiator mixture in an amount of preferably about 0.1 to about 10%, more preferably about 0.5 to about 5% by weight based on the weight of the polymer. After mixing, the mixture is heated in an oven at a temperature of about 60 to 100° C., for about 15 to 30 hours for in-situ polymerization.

In mixing the graphite with the polystyrene monomer, as discussed above, it is important to have uniform distribution of the graphite. As such, the surface of the acid treated graphite, as mentioned above, may be functionalized with glycidyl methacrylate (GMA). An example of the surface treatment of the graphite using GMA follows in Example 1 which is not to be construed as limiting.

The multi-layered nano-graphite may also be melted and blended with polymer carriers, such as polystyrene, polymethyl methacrylate (PMMA), ethyl methacrylate (EMA). The loading can be as high as 40%. Mixing temperature is about 150 to about 300° C., typically about 225° C. for EMA, and mixing time about 0 to about 3 minutes, typically less than one minute for EMA carrier containing 40 percent by weight nano-graphite, are crucial for effective dispersing of nano-graphite throughout the polymer. Mixing may be conducted by any standard method know in the art. Preferably, the components are mixed using a Banbury mixer.

After in-situ polymerization or melt compounding, the multi-layered nano-graphite/polystyrene compound is foamed using a batch foaming process or standard extrusion process. Extruded polystyrene is made by continuously extruding molten polystyrene containing a blowing agent under elevated temperature and pressure into ambient or vacuum conditions, allowing the mass to expand into a light-weight, closed-cell foam.

Standard extrusion processes and methods which may be used in the process of manufacturing the invention are described in commonly owned U.S. Pat. No. 5,753,161 which is herein incorporated by reference in its entirety.

In the extrusion process, an extruded polystyrene polymer, multi-layered, nano-graphite foam is prepared by twin-screw extruders (low shear) with flat die and plate shaper. Alternatively, a single screw tandem extruder (high shear) with radial die and slinky shaper can be used. Multi-layered nano-graphite is then added into the extruder preferably about 0.1 to about 10%, more preferably about 0.5 to about 3% by weight based on the weight of the polymer along with polystyrene, a blowing agent, and optionally other additives. In a preferred embodiment, an extruded polystyrene polymer foam is prepared by twin-screw extruders (low shear) with flat die and plate shaper. Alternatively, a single screw tandem extruder (high shear) with radial die and slinky shaper can be used. Preferably, the multi-layered nano-graphite compound is added into the extruder via multi-feeders, along with polystyrene, a blowing agent, and/or other additives.

The plastified resin mixture, containing multi-layered nano-graphite, polymer, and optionally, other additives are heated to the melt mixing temperature and thoroughly mixed. The melt mixing temperature must be sufficient to plastify or melt the polymer. Therefore, the melt mixing temperature is at or above the glass transition temperature or melting point of the polymer. Preferably, in the preferred embodiment, the melt mix temperature is from about 200 to about 250° C., most preferably about 220 to about 240° C. depending on the amount of multi-layered nano-graphite.

A blowing agent is then incorporated to form a foamable gel. The foamable gel is then cooled to a die melt temperature. The die melt temperature is typically cooler than the melt mix temperature, in the preferred embodiment, from about 100° C. to about 130° C., and most preferably from about 120° C. The die pressure must be sufficient to prevent prefoaming of the foamable gel, which contains the blowing agent. Prefoaming involves the undesirable premature foaming of the foamable gel before extrusion into a region of reduced pressure. Accordingly, the die pressure varies depending upon the identity and amount of blowing agent in the foamable gel. Preferably, in the preferred embodiment, the pressure is from about 50 to about 80 bars, most preferably about 60 bars. The expansion ratio, foam thickness per die gap, is in the range of about 20 to about 70, typically about 60.

Any suitable blowing agent may be used in the practice on this invention. Blowing agents useful in the practice of this invention include inorganic agents, organic blowing agents, chemical blowing agents, and combinations thereof. Suitable inorganic blowing agents include carbon dioxide, nitrogen, argon, water, air, nitrogen, helium, and combinations thereof. Organic blowing agents include aliphatic hydrocarbons having 1-9 carbon atoms, aliphatic alcohols having 1-3 carbon atoms, fully and partially halogenated aliphatic hydrocarbons having 1-4 carbon atoms, and combinations thereof. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include fluorocarbons, chlorocarbons, chlorofluorocarbons and cyclopentane. Examples of fluorocarbons include methyl fluoride, perfluoromethane, ethyl fluoride (HFC-161), ethyl fluoride, 1,1-difluoroethane (HFC-152a), 1,1,1-trifluoroethane (HFC-143a), 1,1,1,2-tetrafluoro-ethane (HFC-134a), 1,1,2,2-tetrafluoroethane (HFC-134), pentafluoroethane (HFC-125), difluoromethane (HFC-32), perfluoroethane, 2,2-difluoropropane (HFC-272fb), 1,1,1-trifluoropropane (HFC-263fb), perfluoropropane, 1,1,1,3,3-pentafluorobutane (HFC-365mfc), 1,1,1,3,3-pentafluoropropane (HFC 245fa), 1,1,1,2,3,3,3-heptafluoropropane (HFC-227ea), dichloropropane, difluoropropane, perfluorobutane, and perfluorocyclobutane. Partially halogenated chlorocarbons and chlorofluorocarbons for use in this invention include methyl chloride, methylene chloride, ethyl chloride-1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesutlfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide, trihydrazino triazine, and combinations thereof.

In the present invention it is preferable to use about 6 to about 14%, preferably about 11%, cyclopentane by weight based on the weight of the polymer. It is preferred to add about 0 to about 4% ethanol, about 3 to about 6%, preferably about 3.5% carbon dioxide. All percentages are based on the weight of the polymer.

Optional additives may be incorporated in the extruded foam product and include additional infrared attenuating agents, plasticizers, flame retardant chemicals, pigments, elastomers, extrusion aids, antioxidants, fillers, antistatic agents, UV absorbers, citric acids, nucleating agents, surfactants, processing aids, etc. These optional additives may be included in any amount to obtain desired characteristics of the foamable gel or resultant extruded foam products. Preferably, optional additives are added to the resin mixture but may be added in alternative ways to the extruded foam manufacture process.

The product produced by the above-described process is a rigid, foam insulation board which is about 1/8 to 12 inches thick, typically 1 to 4 inches thick. The density of the foam board is typically about 1.2 to about 5 pcf, typically about 1.4 to about 3 pcf.

Having generally described this invention, a further understanding can be obtained by reference to certain specific examples illustrated below which are provided for purposes of illustration only and are not intended to be all inclusive or limiting unless otherwise specified.

EXAMPLE 1

Functionalization of Graphite

Figure 2:
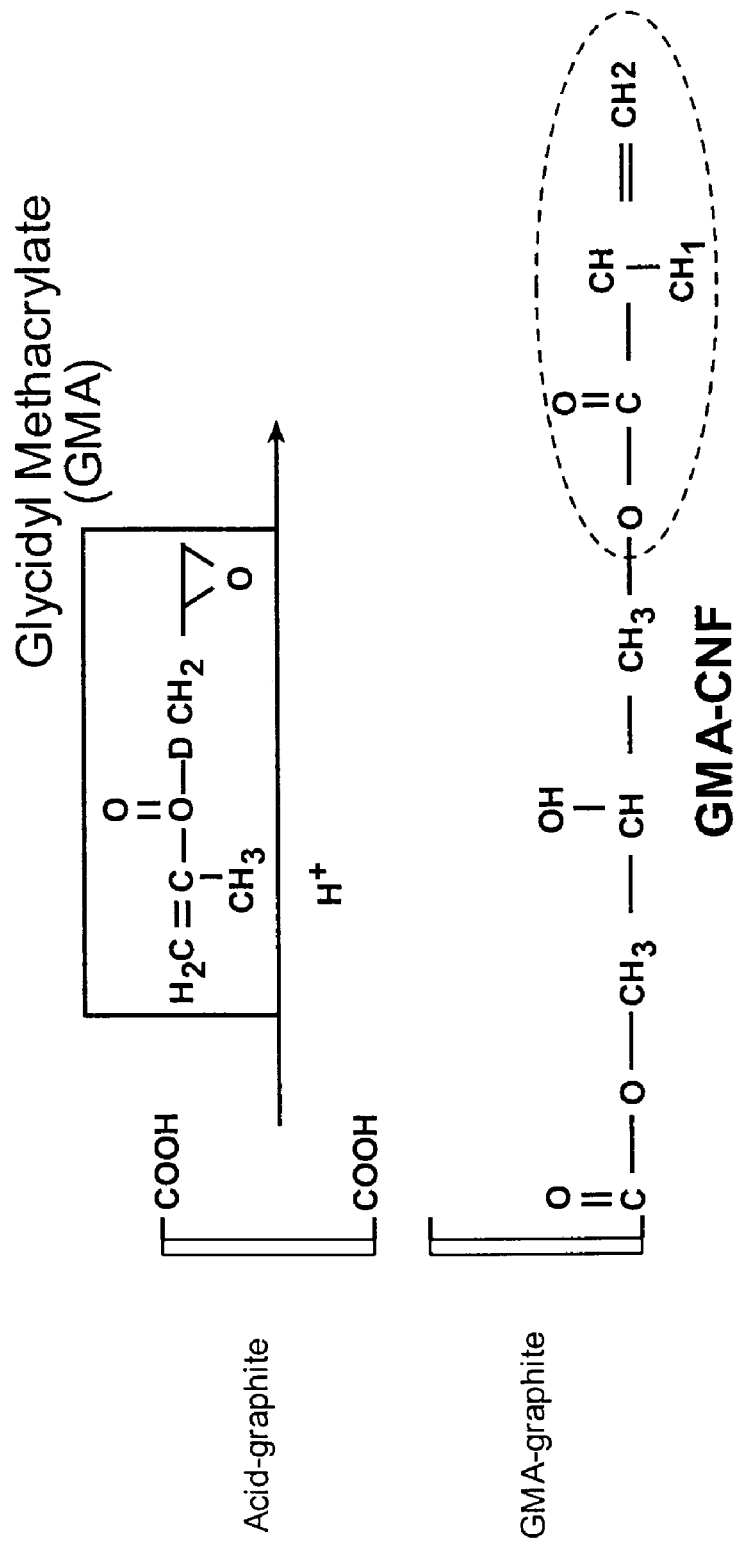
FIG. 2 is a diagram of a treatment used on the graphite of the present invention.

One gram of graphite was homogenized in 200 ml dimethyl formamide (DMF) solvent for three minutes and then sonicated for 30 minutes to form a dark suspension. GMA (0.464 g) was dissolved in 100 ml DMF separately and then mixed with the previous graphite suspension. Upon adding concentrated sulfuric acid as the catalyst, the reaction mixture was magnetically stirred at 65° C. for 24 hours. The suspension was then cooled down and filtered to form a wet cake. The cake was washed with additional DMF until the filtrate was clear. The wet cake was dried under vacuum at 70° C. overnight to remove the residual solvent. The fluffy resulting material (0.81 g) was GMA-functionalized graphite. FIG. 2 illustrates a comparison of the structure of the acid-treated graphite and the GMA-graphite.

The dispersion of both acid-treated graphite and GMA-functionalized graphite in the styrene monomer was investigated using optical microscopy as shown in FIG. 3. Four different suspensions (a-d) were prepared in this study showing 1% graphite by weight of the styrene monomer. In (a), acid-treated graphite without homogenization or ultra-sonication is shown. FIG. 3(b) shows acid-treated graphite, with homogenization (3 mins.) and ultra-sonication (30 mins.). Comparing (a) and (b), it shows that when using certain mechanical forces, such as homogenization and ultra-sonication, a better dispersion of graphite was achieved. However, there are still considerably large amounts of agglomerates existing in suspension (b). Suspension (c) was GMA-functionalized graphite dispersed in the styrene without homogenization or ultra-sonication. As shown in (c), even without further shear-mixing or sonication, the dispersion of graphite was substantially improved as compared to that in (b). Furthermore, if suspension (c) was also homogenized and sonicated for a certain while, a uniform distribution of finer graphite particles could be obtained, as shown in (d) which shows GMA-functionalized graphite with homogenization (3 minutes) and ultra-sonication (30 minutes). Using this chemical treatment, the dispersion of the resulting graphite is substantially improved.

EXAMPLE 2

The invention is further illustrated by the following Example 2, which is not to be construed as limiting, in which all foam boards are extruded polystyrene foam boards. In the following samples and control samples, rigid polystyrene foam boards are prepared by a twin screw LMP extruder with flat die and shaper plate; and a two single screw tandem extruder with radial die and slinky shaper. A vacuum may also be applied in both of the above described pilot and manufacturing lines.

Table 3 shows the process conditions for samples in a twin screw extruder for making foam boards having a width of 16 inches and a thickness of one inch.

TABLE 3

Process Conditions of Samples

| | Samples on Table 8 |
|---|---|
| Wt. % of nano-graphite | 1 to 5 |
| Wt. % of talc | 0.5-1.5 |
| Wt. % of nano-carbon black | 0 to 6 |
| Wt. % of mica | 0 to 4 |
| Wt. % of HCFC-142b | 11 |
| Wt. % of $CO_2$ | 0 |
| Extruder Pressure, Kpa (psi) | 13000-17000 |
| | (1950-2400) |
| Die Melt Temperature, (° C.) | 117-123 |
| Die Pressure, Kpa (psi) | 5400-6600 |
| | (790-950) |
| Line Speed, m/hr (ft/min) | 110-170 |
| | (6-9.5) |
| Throughput, kg/hr | 100 |
| Die Gap, mm | 0.6-0.8 |
| Vacuum KPa | 0-3.4 |
| (inch Hg) | (0 to 16) |

Nano-graphite used was prepared from expanded graphite, as discussed above, which was further treated by melt compounding with polystyrene. The graphite loading and carrier are specified in Table 4 (compounds A and B). Stabilized hexabromocyclododecane (Great Lakes Chemical, HBCD SP-75) was used as flame retardant agent in the amount of 1% by weight of the solid foam polymer.

TABLE 4

Materials for Compound A & B

| Graphite Type | Exfoliated Graphite (Description) | Carrier |
|---|---|---|
| A Nano Grafoil MB | Fine size expanded graphite, less than 10 um from GraphTech, 40% loading | Ethyl methacrylate (EMA) |
| B Graphite Nano-Concentrate | Grade LBG expanded graphite from Superior Graphite, 40% loading | Polystyrene (Melt Index 8) |

The results of above examples are shown in Table 5. All R-values and compressive strength are tested after the samples aged for more than 30 days, unless otherwise indicated.

TABLE 5

Melt Blending Layered Graphite/PS Foam

| Run # | Aged R-value K·m2/K (F·ft2·hr/Btu) | Density Kg/m3 (pcf) | Average Cell micron | Compressive Strength psi | Nano-graphite Wt % |
|---|---|---|---|---|---|
| Control sample | 0.792 (5.49) | 27.68 (1.73) | 240 | NA | 0 |
| 696-2 | 0.907 (6.29*) | 28.64 (1.79) | 220 | 21.55 | 1 (compound A) |
| 696-4 | 0.949 (6.58*) | 30.72 (1.92) | 174 | 22.67 | 3 (compound A) |
| 692-2 | 0.891 (6.18) | 27.84 (1.74) | 222 | 25.69 | 1 (compound B) |
| 692-3 | 0.916 (6.35) | 28.8 (1.80) | 187 | 27.27 | 2 (compound B) |
| 692-4 | 0.92 (6.38) | 28.96 (1.81) | 169 | 26.87 | 3 (compound B) |

*When aged 180 days, sample 696-2 R = 5.8; and sample 696-4, R = 6.1

As shown from above samples, the addition of nano-graphite in foaming processing, preferably about 0.25 to about 3% by the weight of the solid foam polymer has profound effect on the thermal resistance property, an enhancement of R-value from about 8% to about 20% of the foam board products. The in-situ polymerized, exfoliated nano-graphite with surface chemical modification was the most effective, intercalated expanded nano-graphite by melt-blending is also effective with a much lower cost.

EXAMPLE 3

Table 6 compares the operating conditions between batch foaming and traditional low-density foam extrusion.

TABLE 6

Comparison of Operating Conditions between Batch and Extrusion Foaming

| Operating conditions | Extrusion | Batch Foaming |
|---|---|---|
| Temperature (° C.) | 100~140 | 120 |
| Pressure (psi) | 1000~2000 | 2000 |
| dP/dt (Pa/sec) | $10^6$ | $10^6$ |

Prior to batch foaming, the polymerized multi-layered nano-graphite/polystyrene compound is heated and compressed into a solid shape. The solid sheet is cut into small pieces according to the size of pressure vessel, such as 77×32×1 mm. The solid sheet specimen is then placed in a mold and foamed in a high-pressure vessel at about 80 to about 160° C., typically about 120° C. and about 500 to about 4000 psi, typically about 2000 psi. The solid sheet remains in the pressurized vessel for about 8 to about 50 hours, typically about 12 hours, after which the pressure in the vessel was released quickly (about 12 seconds) for foaming.

The multi-layered nano-graphite/polystyrene foam of the batch foaming samples were evaluated to determine the amount infrared radiation transmitted through the foam. As infrared light is the major form of thermal radiation.

A piece of batch-foamed sample containing polystyrene and about 3% graphite, and two other comparison samples containing polystyrene or polystyrene and 5% nano-clay were selected. On one side of the foam sample a light source of infrared laser was placed. On the other side of the sample, either a detector was placed to record the transmission light intensity or a temperature camera was placed to monitor the surface temperature change. The results are summarized in Tables 7 and below.

TABLE 7

Infrared Light Transmission
Through foam samples of polystyrene (PS), polystyrene and 5% nano-clay (PS/5% clay), and polystyrene and 3% nano-graphite (PS/3% graphite)

| IR Transmission Intensity (watts) | Emissive Intensity | Received Intensity | % Trans |
|---|---|---|---|
| PS (control sample) | 0.5 | 0.05 | 10% |
| PS/5% MHABS* | 0.5 | 0.02 | 4% |
| PS/3% milled graphite worms | 0.5 | 0.01 | 2% |

*in-situ polymerized compound with 5% of reactive cationic surfactant, 2-methacryloyloxyethylhexadecyldimethyl ammonium bromide (MHAB) treated Na+ montmorillonite with 95% styrene monomer As shown in Table 7, 10% of the light transmits through the pure PS foam sample, while only 4% through the PS/5% clay foam sample and only 2% through the PS/3% graphite sample. Both clay and graphite have the attenuation effect on the infrared light, however, as shown in the above table, PS/3% graphite has considerably better transmission attenuation.

The temperature of the PS/graphite sample, on the side of the sample opposite to the light source, was slightly elevated, having an increase of about 2-3° F. after 60 seconds of exposure (Table 8). There was no obvious change in surface temperature for foam samples of pure PS and PS/clay. As such, PS/graphite foam attenuates thermal radiation and enhances the heat solid conduction. Further, by improved graphite dispersion and concentration, these trends are expected to be more significant.

TABLE 8

Temperature change for foam samples of PS, PS/5% clay, and
PS/3% graphite on the surface opposite to the light source

| | IR Camera Temperature at Interval Time in Seconds ° F. | | | | | | |
|---|---|---|---|---|---|---|---|
| | 0 | 10 | 20 | 30 | 40 | 50 | 60 |
| PS (control sample) | 78.4° F. | 78.4° F. | 78.7° F. | 78.8° F. | 78.4° F. | 78.5° F. | 78.5° F. |
| PS/5% MHABS | 79.2° F. | 79.2° F. | 79.5° F. | 79.6° F. | 79.4° F. | 79.5° F. | 79.6° F. |
| PS/3% milled graphite worms | 80.6° F. | 81.2° F. | 81.7° F. | 82° F. | 82.6° F. | 82.8° F. | 83° F. |

EXAMPLE 4

By using a foaming extrusion die, foam samples having different compositions with similar densities were prepared (FIG. 4 a)-d)). The corresponding cell morphology and the important thermal and mechanical properties, including compressive properties, IR radiation transmission, and flammability, were analyzed.

Atofina (CX 5197) polystyrene was used as received (pellet form). All samples described in this study contain 1 wt % HBCD-SP flame retardant from Great Lakes. The polystyrene/multi-layered nano-graphite compound was mechanically blended at 185° C. using a twin-screw extruder (Leistritz ZSE-27; L/D=40; D=27 mm).

Foam extrusion for each material is carried out by pumping the blowing agent into the twin-screw extruder using a syringe pump. Atofina supplied the HCFC blend for this study; (H142B/22) 60% by weight HCFC-142b, and 40% by weight R-22. During the experiments, H142B/22 was used as the foaming agent and its content was 11 wt % by weight of polymer. The foaming temperature in the die was 35° C. and the die pressure was around 850 psi. The mass flow rate of the polymer melt was around 90 grams/min.

All properties were tested on rectangular samples with 4 to 6 mm in thickness and 80 to 100 mm in width. The specimens are prepared by cutting segments out of extruded foams, and test results of aged insulation R-value of example 2 as shown on Table 9.

TABLE 9

In-situ Nano-Graphite/PS Foam

| Run # | Aged R-value K·m2/K (F·ft2·hr/Btu) | Amount of Layered Graphite Wt % | Amount of Talc Wt % | Average Cell micron | Blowing Agent Wt % |
|---|---|---|---|---|---|
| Control sample | 0.766 (5.31) | 0 | 1 | 155 | HCFC 142b 6%; R-22 4% |
| 040122-03 | 0.826 (5.73) | 0.25 | 0 | 100 | HCFC 142b 6%; R-22 4% |

Figure 5:
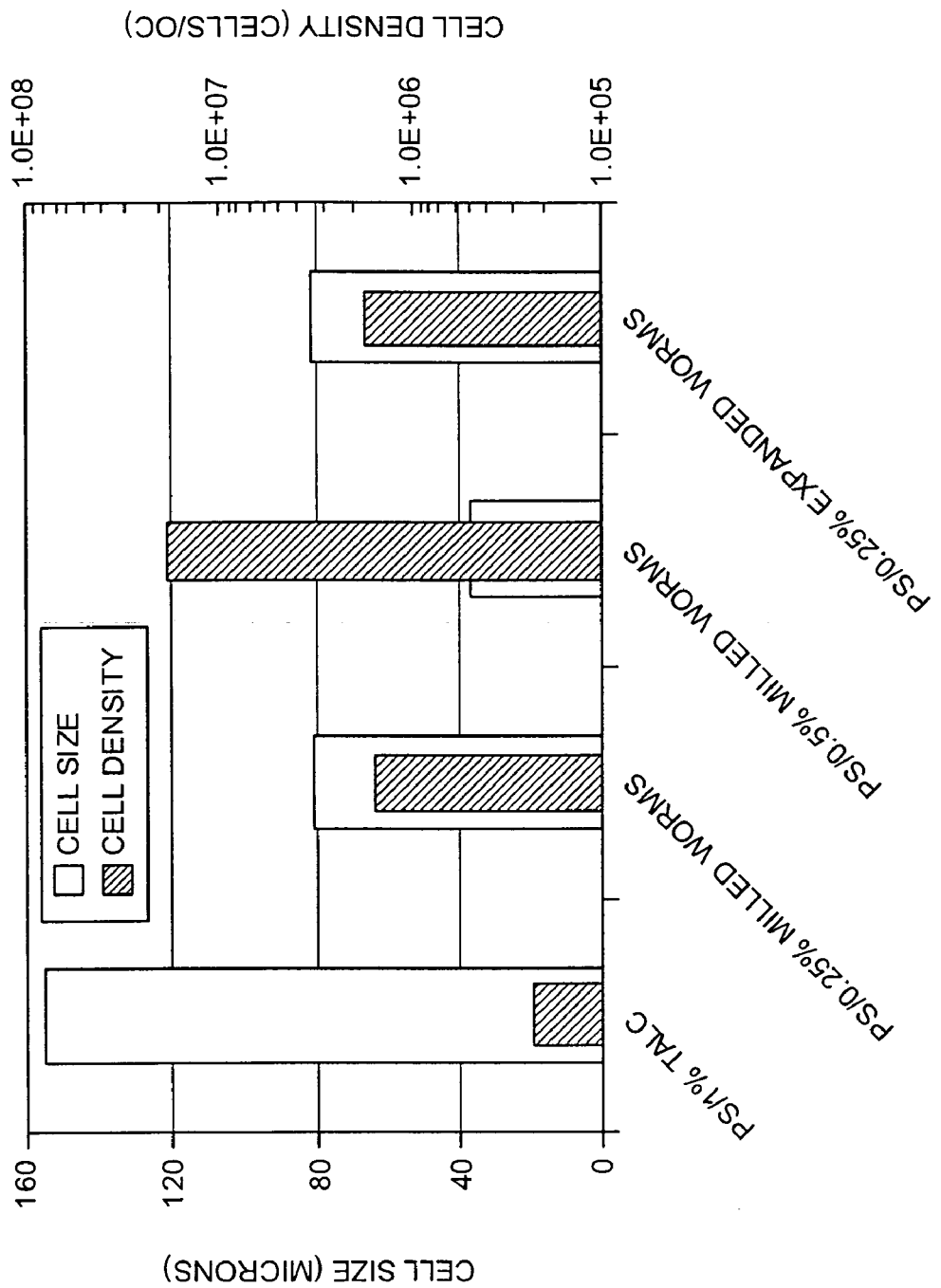
FIG. 5 is a graphical illustration showing a comparison of polystyrene foam containing talc vs. polystyrene foam containing multi-layered nano-graphite.

FIG. 4 illustrates the foam structure for the samples after adding multi-layered nano-graphite. Compared with the polystyrene (PS)/1 wt % talc foam sample (FIG. 4a), the addition of graphite significantly decreases the foam cell size and increases the cell density, indicating the graphite is an effective nucleating agent of polystyrene with H142B/22 as the foaming agent. When the concentration of the milled graphite worms increases from 0.25 wt % (FIG. 4b) to 0.5 wt % (FIG. 4c), the cell density is further increased. FIG. 5 further illustrates the trend. After adding 0.25% milled graphite worms in polystyrene, the cell size decreases to 81 μm from 155 μm of the polystyrene/1 wt % talc foam sample and the cell density increases to $1.6 \times 10^6$ cells/cc from $2.3 \times 10^5$ cells/cc.

As shown, the addition of multi-layered nano-graphite shrinks the cell wall thickness and the strut size, which may influence the mechanical strength and the insulation property. When 0.25 wt % milled nano-graphite worms are present in polystyrene foam, the R-value increases 8% from 5.31 K·m²/K of polystyrene/1 wt % talc foam sample to 5.73 K·m²/K. Furthermore, by exposing the graphite samples under intensive UV light, it shows no significant change after 1000 hours; however, the sample without graphite has already cracked after the same treatment. The graphite foam sample provides excellent properties in insulation and UV resistance.

Figure 6:
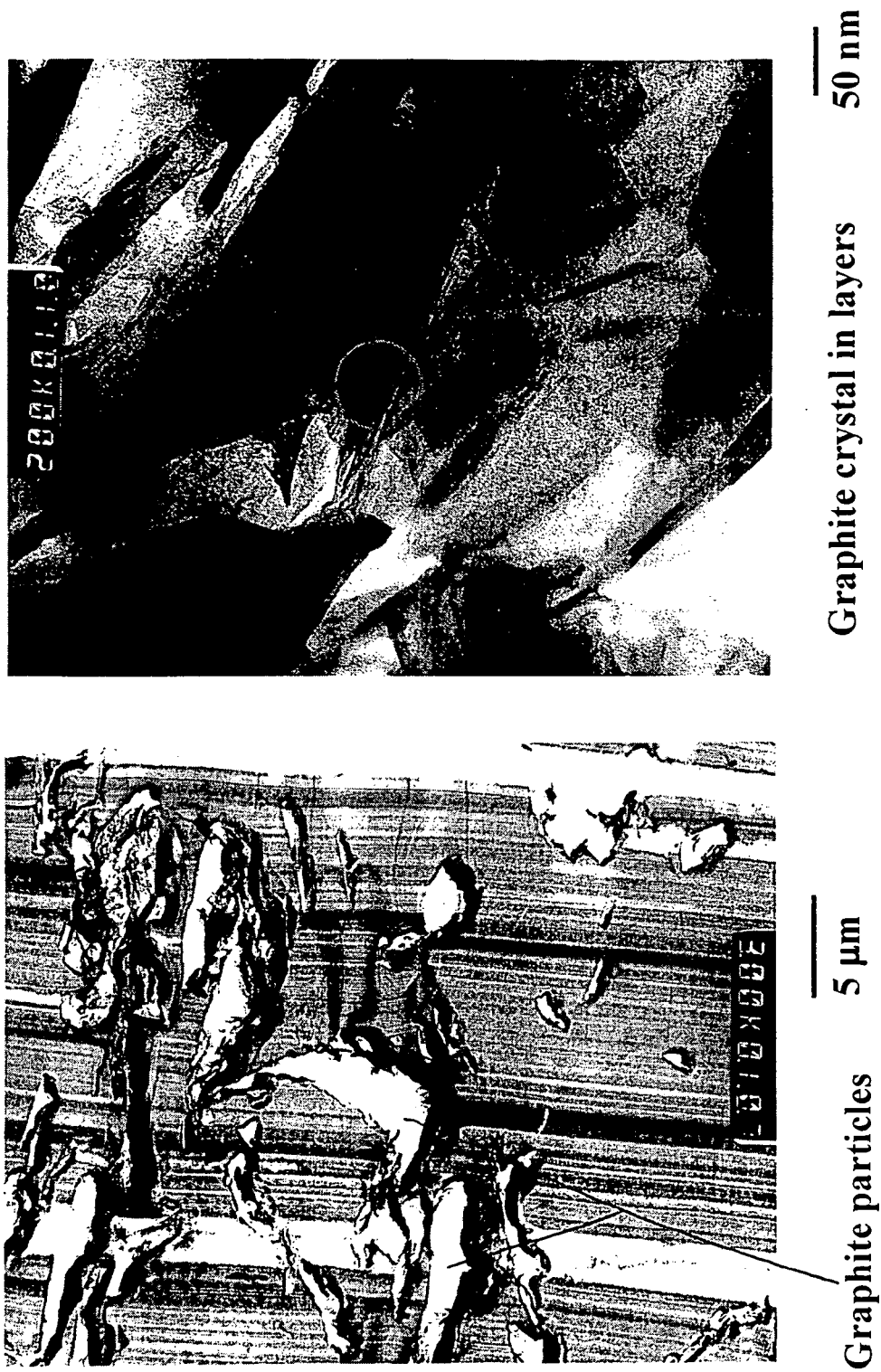
FIG. 6 is a TEM (transmission electron microscope) image showing the 3% milled, expanded, multi-layered nano-graphite distribution in polystyrene foam.

FIG. 6 is a TEM image of multi-layered nano-graphite in a polystyrene matrix.

EXAMPLE 5

The following table shows a comparison of the oxygen content between chemically-treated graphite and untreated graphite.

TABLE 10

Oxygen Content of Polystyrene Foams Containing

| Treatment | Oxygen Content % |
|---|---|
| Chemically-modified expanded graphite with $HNO_3$ at 115-140° C. | 2.8 |
| Chemically-modified expanded graphite with reactive gas | 2.2 |
| Untreated expanded graphite | 2 |

EXAMPLE 6

FIG. 1, shows an X-ray diffraction graph confirming that there is no significant change in d-value of 002 peaks (2θ=26.4~26.7°), which is around 3.33~3.35 angstroms, a typical d-spacing between carbon layers in graphite. This indicates that the expansion does not happen in each individual gallery spaces of graphite carbon layers. Expanded graphite, or so called worms or "exfoliation" of graphite in which graphite expands by hundreds of times along the c-axis (002 direction), is usually obtained by rapid heating of a graphite intercalation compound (GIC). The most common choice of intercalation compound is graphite bisulphate obtained by reaction with a mixture of sulphuric and nitric acids because of its ability to yield expansions as high as several hundreds time. The expanded graphite particle is composed of many nanosheets having a thickness of about 10 to about 100 nm. Each nanosheet is made up of many single carbon layers of graphite with the d-space having no significant change as shown in FIG. 1 after macro-scale exfoliation.

Table 11 shows examples of the total layer thickness of the expanded nano-graphite worms (without polystyrene) and milled nano-graphite worms (without polystyrene) compared to (PS)/nano-graphite samples after different treatments by X-ray diffraction (XRD) characterization. The following is an explanation of the XRD process.

When determining lattice parameters of exfoliated expanded graphite, the graphite layer structure keeps the same, for a particular d involved, e.g. 002, the Bragg angle θ to satisfy will not be change according to Bragg law:

$$\lambda = 2d \sin \theta$$

This indicates that there is no change in the d-space for each individual crystal. However, after expanding, the thickness of graphite crystals decreases. Therefore, the width of the diffraction curve increases as the thickness of the crystals decreases according to Scherrer formula:

$$t = 0.9 \lambda / B \cos \theta$$

Where,

λ, the wave length, for the Cu Kα$_1$ line, 1.540562 A d is the lattice space, for the graphite 002, around 3.37 A θ is diffraction angle, the 002 peak for graphite 2θ, around 26.45° t is the thickness of the m layered graphite, t=md

B is the angular width at an intensity equal to half the maximum intensity, a rough measurement:

$$B = /2(2\theta_1 - 2\theta_2)$$

Where, the two limiting angles, $2\theta_1$ and $2\theta_2$, at which the diffracted intensity drops to zero.

It was observed that the expanded graphite and its composite with polystyrene, the full width, B at half maximum became broader as shown in the following table and figures. The calculated thickness, t of layered graphite is about 50 nm.

There is no change of the d-spacing between the lattice planes (002). This indicates that there is no exfoliation, nor exfoliation between the multi-layered graphite. However, it is important to note that the multi-layered nano-graphite and its composite with polystyrene, the full width, B at half maximum, became broader as shown in the following table 11 and in FIG. 1. The calculated thickness, t, of layered nano-graphite is less than about 100 nm, typically about 50 nm.

TABLE 11

X-ray diffraction of graphite and polystyrene (PS/graphite composites)

| | 2θ (°) | d (A) | Miller Indices hkl | B (°) | Crystal Thickness t (nm) |
|---|---|---|---|---|---|
| Samples | 26.45 | 3.37 | 002 | 0.190 | 43.0 |
| Expanded worms* | 26.72 | 3.33 | 002 | 0.095 | 86.0 |
| Milled worms | 26.56 | 3.35 | 002 | 0.275 | 29.7 |
| PS/Flake graphite | 26.54 | 3.36 | 002 | 0.125 | 65.3 |
| PS/Expanded worms | 26.69 | 3.33 | 002 | 0.160 | 51.0 |
| PS/Milled worms | 26.65 | 3.34 | 002 | 0.170 | 48.0 |

*the profile of the peak is not perfect for B-value calculation

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

The invention claimed is:

1. A multi-functional polymeric foam material comprising:
   a) a polymer;
   b) a blowing agent; and
   c) multi-layered nano-graphite having a size in at least one dimension less than about 100 nanometers, said multi-layered nano-graphite being chemically modified to include carboxyl and phenolic hydroxyl functional groups,
   wherein other dimensions of said multi-layered nano-graphite are less than about 20 microns.

2. The multifunctional polymeric foam material of claim 1, wherein the multi-layered nano-graphite is present in an amount of from about 0.1 to about 10% by weight based on the polymer.

3. The multi-functional polymeric foam material of claim 2, wherein the multi-layered nano-graphite is present in an amount of from about 0.5% to about 3% by weight based on the polymer.

4. The multi-functional polymeric foam material of claim 1, further comprising one or more additives selected from the group consisting of cell size enlarging agents, infrared attenuating agents, plasticizers, flame retardant chemicals, pigments, elastomers, extrusion aids, antioxidants, fillers, antistatic agents and UV absorbers.

5. The multi-functional polymeric foam material of claim 1, wherein said multi-layered nano-graphite further comprises a plurality of nanosheets.

6. The multi-functional polymeric foam material of claim 5, wherein said plurality of nanosheets have a thickness from about 10 to about 100 nanometers.

7. The multi-functional polymeric foam material of claim 6, wherein said plurality of nanosheets comprises a plurality of single carbon layers of graphite.

8. The multi-functional polymeric foam material of claim 1, wherein the R-value of said material is between about 3 to about 8.

9. The multi-functional polymeric foam material of claim 1, wherein the percent of infrared light transmission is between about 0 to about 2%.

10. A rigid foam insulation board comprising:
a) a polymer;
b) a blowing agent; and
c) multi-layered nano-graphite chemically modified to include carboxyl and phenolic hydroxyl functional groups, said multi-layered nano-graphite having a size in at least one dimension less than about 100 nanometers,
wherein other dimensions of said multi-layered nano-graphite are less than about 20 microns.

11. The insulation board of claim 10, wherein the R-value of said board is between about 3 to about 8.

12. The insulation board of claim 10, wherein said insulation board has a thickness of between about ⅛ inch to about 10 inches.

13. The insulation board of claim 12, wherein the multi-layered nano-graphite is present in an amount of from about 0.1 to about 10% by weight based on the polymer.

14. The multi-functional polymeric foam of claim 1, wherein said multi-layered nano-graphite is surface modified with glycidyl methacrylate.

* * * * *